Dec. 17, 1929.  A. FRIEDMAN  1,740,420
RELIEF VALVE
Filed Oct. 24, 1925
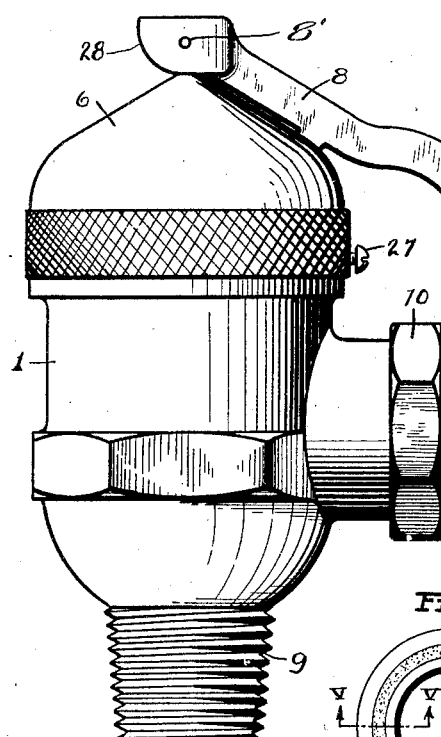
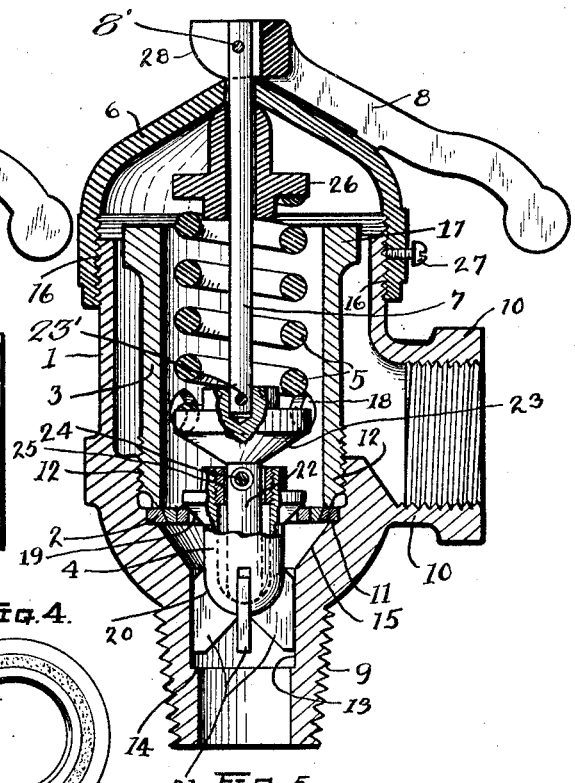
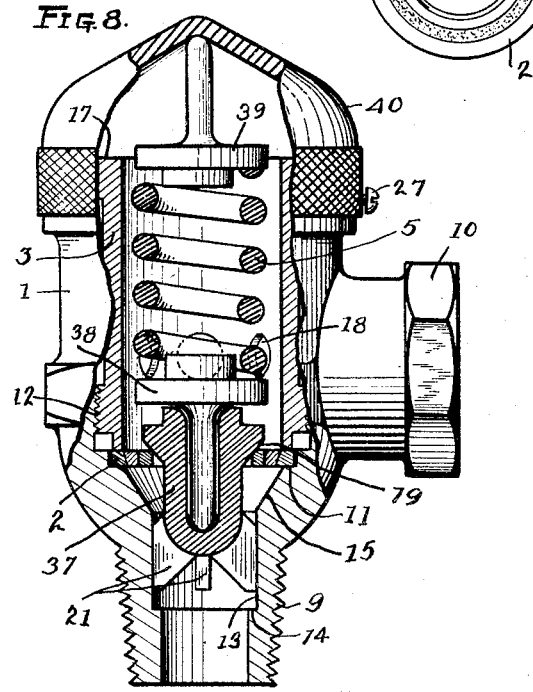
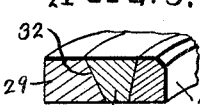
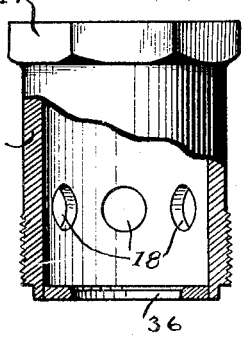
Arthur Friedman
INVENTOR
BY Evans and McCoy,
ATTORNEYS Patented Dec. 17, 1929

1,740,420

UNITED STATES PATENT OFFICE

ARTHUR FRIEDMAN, OF CLEVELAND, OHIO, ASSIGNOR TO THE CLEVELAND HEATER COMPANY, OF CLEVELAND, OHIO, A CORPORATION OF OHIO

RELIEF VALVE

Application filed October 24, 1925. Serial No. 64,483.

This invention relates to improvements in relief valves, and more particularly to adjustable relief valves that are adapted to be regulated to meet varying pressures through the medium of suitable adjustable control mechanisms.

Relief valves have heretofore been proposed wherein excessive pressures lifted a spring pressed valve head. Such relief valves are often rendered inoperative through the cementing together of the valve parts resulting from corrosion or other deteriorating influences that prevent the proper operation of such valves when abnormal pressures develop in the systems with which such valves are used. The use of a frangible diaphragm that ruptures when subjected to certain pressures has also been proposed as a means of safeguarding systems subjected at times to abnormal pressure. Replacement of the diaphragms in such relief mechanisms is required whenever the mechanism operates to relieve the system and, therefore, temporary abnormal conditions are either not relieved or their relief requires frequent replacement of the ruptured diaphragms.

The improved valve herein described, which is particularly designed and adapted for use as a relief valve in connection with automatic storage systems, such as hot water systems and the like, is of simple and inexpensive structure embodying an adjustable spring controlled valve head that is normally adapted to afford relief for predetermined pressures. This valve structure also embodies a valve seat that ruptures when subjected to predetermined pressures and that also includes fusible portions that afford relief for the system when predetermined excessive temperatures are reached. Such an arrangement of valve parts provides a mechanical spring controlled relief for all temporary abnormal pressures and also insures operation of the relief valve under all abnormal dangerous conditions, such as dangerous pressures or temperatures, existing in the system with which the valve is used. The relief of the system through the rupture of the valve seat from either excessive pressure or excessive temperature is independent of the operation of the adjustable spring pressed valve head which might become inoperative through corrosion or disarrangement of the valve parts.

One object of the invention is to provide a generally improved relief valve of the type indicated, which will be exceedingly simple in construction, inexpensive to manufacture, reliable in operation, and wherein the liability to breakage or disarrangement of the parts is reduced to a minimum.

Another object of the invention is to provide a valve structure wherein the valve seat may be readily replaced by removal of the valve cage.

A further object of the invention is to provide a valve structure wherein the valve housing requires a minimum number of machining operations that are of such character that they may be performed at great speed by relatively inexperienced operators.

An additional object of my invention is to provide a relief valve that is normally responsive to abnormal pressures and that embodies a supplemental, independently operating means adapted to positively give relief when either dangerous pressures or dangerous temperatures develop in the system with which the valve is used.

A further and important object is the provision of an improved frangible and fusible valve seat, together with improved means for mounting and securing the seat in the valve housing.

With the above mentioned and other objects in view, the invention consists in the novel construction, arrangement and combination of parts, hereinafter described, illustrated in some of its embodiments in the accompanying drawings, and particularly pointed out in the appended claims.

Referring to the drawings, forming a part of this specification, Figure 1 is a side elevational view of a relief valve constructed in accordance with this invention and provided with means for manually actuating the valve and for holding the same in its open position.

Fig. 2 is a central vertical sectional view of the valve shown in Fig. 1;

Fig. 3 is a side elevational view, shown partly in section, of the valve cage and a modified form of valve seat removed from the valve housing;

Fig. 4 is a top plan view of the improved frangible and fusible valve seat removed from the valve assembly;

Fig. 5 is an enlarged transverse, cross-sectional view of the valve seat shown in Fig. 2;

Figs. 6 and 7 are correspondingly enlarged views of modified forms of valve seats adapted for use in the valve structure shown in Fig. 2; and Fig. 8 is a side elevational view, shown partly in central longitudinal section with portions broken away, of a modified form of the invention as applied to a relief valve having no means for manually moving the valve to and locking it in its open position.

The type of relief valve shown in Fig. 1, Fig. 2, Figure 4 and Fig. 5 as illustrative of my invention, comprises a valve casing 1 having a valve seat 2 removably secured therein by a valve cage 3. A valve head 4 is held in yielding engagement with the valve seat 2 by a spring 5, the pressure of which may be adjusted by turning the screw-threaded cap 6 that is mounted on the valve casing. A valve stem 7, that is connected at one end by the pin 23' to the valve head and at the other end by the pin 8' to a manually operated valve actuating lever 8, provides means for manually lifting the valve head from the valve seat for purposes of inspection or in order to open the valve for other reasons.

The valve casing is preferably formed of a metal casting having a threaded stem 9 by means of which the valve is connected to the system with which it is adapted to be used, and a branch stub 10 that is threaded for connection to any suitable conduit (not shown) that is adapted to receive the fluids passing through the valve.

The valve casing is so designed that a minimum of machine work is required to finish its interior. The valve seat 2 is adapted to be securely seated by the valve cage 3 on an annular shoulder 11 that is formed in the casing. A threaded portion 12 of the casing engages the correspondingly threaded lower end of the valve cage 3. The valve casing also has a cylindrical portion 13 that terminates in an annular shoulder 14 and that serves as a guide face for the valve head. The annular shoulder 14 may also function as a stop for limiting the movement of the valve head upon rupture of the valve seat as hereinafter described. The portion of the valve casing adjacent the annular shoulder 11 and underlying the valve seat 2 is cut away by forming the conical face 15 in order to provide sufficient space around the valve head to permit liquid to come in contact with the valve seat and also to allow sufficient area for the escape of the relieved fluids upon rupture of the valve seat. The upper portion 16 of the valve casing is suitably threaded to receive the valve cap 6.

The ring shaped valve seat 2 is removably secured in place by the valve cage 3, the lower end of which is threaded to engage the correspondingly threaded portion 12 of the valve casing and the upper end of which extends above the side walls of the casing 1 and has a nut-shaped portion 17 that is adapted to be engaged by a suitable wrench (not shown) for its removal and replacement. A series of relief ports 18 are formed in the valve cage in order to provide a suitable passage to the branch stub 10 for the relieved fluids passing through the valve.

The valve head 4 has a conical valve seating face 19 that engages the valve seat 2 to close the relief valve. A hollow depending body portion 20 of the valve head has a plurality of guide wings 21 extending outwardly therefrom and adapted to guide the valve head into proper seating relation with the valve seat by engagement with the cylindrical guide portion 13 of the valve casing. The lower extremities of the guide wings 21 are adapted to seat on the annular shoulder 14 of the casing in the event that the valve seat is ruptured to thereby maintain an open passage through the valve for relieved fluids after the rupture of the valve seat.

The valve head is pivotally mounted on the stem 22 of a spring abutment 23 by a loosely fitting transverse pivot rod 24 that is secured within a threaded collar 25. The pivot rod 24 is preferably smaller than the opening through the stem 22 and the bore of the threaded collar 25 is larger than the stem 22 in order that the valve head may shift laterally of the stem 22 to insure firm seating engagement of the valve head on the valve seat. The lower end of the stem 22 engages the closed end of the depending body portion of the valve head well below the seating face of the valve head in order to so apply the pressure of the spring 5 to the valve head as to permit the valve head to be self-adjusting on the valve seat. The upper end of the spring abutment 23 has a suitable spring receiving seat formed thereon that is adapted to receive the lower end of the spring 5. The upper end of the helical spring 5 engages a corresponding seat formed on a spring abutment sleeve 26 that is adapted to seat against the valve cap 6 to thereby impose adjustable yielding seating pressure on the valve head that is regulated in intensity by turning the threaded valve cap 6. A screw 27 serves to lock the valve cap in its adjusted position.

The lower end of the valve stem 7 is pivotally secured to the spring abutment 23 by the pin 23' and the upper end slidably fits within the sleeve 26 and extends through a suitable aperture formed in the valve cap 6. A valve testing lever 8 that has a pair of spaced cam portions 28 between which the valve stem 7 is pivotally mounted by the pin 8', is arranged to lift the valve head 4 from the valve seat 2 for testing the valve or for other purposes when it is swung about its pivotal connection with the valve stem 7, to substantial alignment therewith. The valve remains in an open position so long as the testing lever 8 occupies this position.

The valve seat 2 as shown in Figs. 4 and 5, comprises a pair of concentric rings 29 and 30 that are connected by an interposed ring 31 of a material that will soften sufficiently under dangerous temperatures to permit the rupture of the valve seat through the separation of the rings 29 and 30 or the distortion of the valve seat whereby the valve head does not seat tightly thereon and the valve remains open until a new valve seat is installed. Such material may either be a metal alloy or other material having the required physical characteristics. The ring 31 may also be of a frangible material that will rupture under excessive pressures to thereby open the valve in the event that the spring controlled valve head 4 does not function. The rupturing of the valve seat may result from either the tearing apart or the crushing of the material of the ring 31 or from the separation of the ring elements along the abutting surfaces of the elements 29 and 30 that is referred to herein as a surface of cleavage 32. The term "frangible" as applied herein to the valve seat refers to a valve seat wherein the elements are adapted to separate or rupture when subjected to excessive differential pressure. The term "fusible" as used herein includes both the melting of a material and the softening of the material to sufficient degree from heat to permit separation, warping or deformation of the elements of the valve seat.

Attention is invited to the angularity of the surface of cleavage 32 of the rings 29 and 31 with respect to the longitudinal axis of the valve seat. Changes in the angularity of the contacting surface of the elements of the valve seat changes the strength of the union of the elements by providing a larger or smaller area of contact and also by changing the direction of application of the rupturing forces relative to the surface of cleavage. This relation of the elements of the valve seat provides means whereby the valve seat may be designed to rupture at certain predetermined pressures, independent of the rupturing of the valve seat from dangerous temperature conditions. By choosing different materials, such as metal alloys or similar substances having relatively low melting or softening points, and by changing the thickness of the valve seat and the angularity of the surface of cleavage of the elements of the valve seat, a relatively wide range of temperature and pressure rupturing valves can be arranged for.

A modified form of frangible and fusible valve seat is shown in Fig. 6 wherein an outer ring 33 is united to an inner ring 34 along a surface of cleavage 35. In some instances it may be desirable to cement the ring elements together with a material that will soften sufficiently at a critical temperature to permit the differential pressure of the spring upon the inner ring 34 to separate the elements of the valve seat. In other instances the entire inner ring 34 may be formed of a fusible material that permits the rupture or distortion of the valve seat when subjected to excessive temperatures and that is capable of being crushed or otherwise broken up or separated from the outer ring or distorted to provide an opening between the inlet and outlet ports when subjected to excessive pressures. Both of these types of valve seats are illustrated in Fig. 6.

The modified form of valve seat shown in Fig. 7 comprises an annular body portion 41 having a plurality of spaced apertures formed therein that are adapted to be filled by plugs 42 of fusible material, the melting or softening of which opens the valve and permits the escape of fluid from the system when the valve seat is subjected to a predetermined temperature. The body portion 41 of the valve seat is preferably formed of a friable material that will rupture when subjected to a predetermined pressure to provide a supplemental pressure as well as a supplemental temperature controlled relief for the valve.

Fig. 3 shows a further modification of this invention wherein the valve cage 3 of the form used in the valve structure shown in Fig. 1 and Fig. 2 has a frangible valve seat 36 cemented therein by means of a material that will soften sufficiently at temperatures dangerous to the system to release the valve seat 36 from the valve cage 3 thereby open the valve. The valve seat 36 may also be formed of a fusible and frangible material that softens a sufficient degree to open the valve under dangerous temperatures or pressure conditions. A valve seat of either character may conveniently be cemented or otherwise suitably secured to the valve cage 3 before the valve cage is mounted in the valve casing.

Fig. 8 shows a simplified form of valve structure in which there is no provision for testing the valve by manually opening the valve during the operation of the system. The casing, valve seat, valve cage and operating spring for the valve shown in Fig. 8 are identically the same as the corresponding parts of the valve structure shown in Fig. 2 and are correspondingly numbered. The valve head 37 of the structure shown in Fig. 8 differs only slightly from the valve head shown in Fig. 2. The pressure from the spring 5 is transmitted directly to the valve head 37 by a spring seating member 38 that loosely fits within the open end of the valve head and that applies pressure to the valve head at the closed end thereof substantially in the manner described in connection with the pressure transmitting stem 22 of the mechanism shown in Fig. 2. The loose fit of the stem of the spring seating member 38 in the valve head permits the valve head to align itself laterally with the valve seat in order to insure complete closing of the valve under all conditions. The upper end of the spring 5 is seated on a spring abutment 39, a portion of which engages a conical seat formed in the crown of the cap 40.

From the above description of the elements of the relief valves herein proposed it will be seen that the elements of each of the valve structures may be inexpensively manufactured. None of the parts are of complicated form and each of the parts is capable of being produced with a minimum of machining and assembled in the valve structure by a relatively inexperienced and inexpensive class of labor. The valve casing has the threaded portions that are necessary to secure the relief valve to the system with which it is intended to operate. The valve receiving portion of the casing has the internally threaded portion that is adapted to receive the valve cage, a shoulder for the valve seat, and a guide face for the valve head. All of these machined portions of the interior of the casing adjoin and are so arranged that they may be finished with minimum expense.

The assembly of the structure is very simple. The valve seat 2 is dropped in place and rigidly secured on the shoulder 11 by tightening the valve cage 3, or is inserted with the valve cage if the form shown in Fig. 3 is used. This assembly also permits very ready removal and replacement of an injured valve seat and, since the seating face of the valve seat is the only element of the valve structure that requires careful machining, all portions of the valve casing may be very roughly machined so long as they provide a fluid-tight mounting for the valve seat 2. Sufficient lateral movement is permitted the valve head to enable it to move to proper seating position upon the valve seat if for any reason the valve seat is slightly eccentric or otherwise unsymmetrically positioned within the valve casing. The valve seat may be carefully finished as a separate unit.

The operation of the valve shown in Fig. 2 is substantially the same for all of the different forms of valve seats. During the operation of a heating system or other system with which the valve is used, pressures develop from abnormal conditions that should be relieved. The abnormal pressure of the system acts against the valve head 4 and the pressure of the spring 5 to lift the valve head a sufficient degree to permit a sufficient quantity of fluid to escape from the system to relieve the abnormal condition. The pressure at which this occurs may be adjusted by changing the character of the spring 5 or by adjusting the cap to different positions on the valve casing.

If, however, the valve is subjected to a dangerous degree of heat from the system, such for instance as the development of steam in a hot water heating system, the fusible ring 31 of the valve seat or the fusible cement by means of which the elements of the valve seat are united, soften a sufficient degree to permit the distortion breaking up or separation of the parts of the valve seat. The temperature at which this occurs may be controlled by changing the fusible material incorporated in the valve seat. When separation of the valve seat occurs, the valve head drops to engagement with the annular flange 14 that prevents further movement of the valve head and maintains the relief valve open until repair is made. For dangerous conditions it is desirable that a repair to the system be made in order that these dangerous conditions will not again develop in the system and the permanent opening of the valve is a warning that such repairs should be made.

If excessive pressures develop in the system and the valve head 4 fails to operate or fails to give sufficient relief to reduce the dangerous pressure in the system, then the valve seat will release the valve head to provide the necessary relief for the system.

The valve testing lever 8, which forms a part of the valve gear, is provided in order that the valve head may be lifted from its seat from time to time in order to test the operation of the valve and also in order to comply with the legal requirements for systems in connection with which valves of this general character customarily are used. The simplified arrangement of the valve gear is such that the complete unit comprising the valve head, the operating gear and the valve cap may be readily assembled and handled as a unit when it is separated from the valve casing.

The simplified form of valve shown in Fig. 8 is particularly intended for use in connection with systems wherein an inexpensive relief valve of this character is desired and wherein it is not necessary to incorporate means for periodically testing the relief valve by lifting the valve head from its seat during the operation of the system. The assembly of the valve shown in Fig. 8 is of such character that any of the elements may readily be removed for inspection, repair or replacement without disturbing the connections of the relief valve with the system.

The operation of the valve shown in Fig. 8 is substantially the same as the operation of the valve structure shown in Fig. 2 and therefore a detailed description thereof is deemed unnecessary.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. A relief valve structure comprising a valve casing having inlet and outlet passages, a pressure responsive valve head interposed between said passages, a supplemental pressure responsive friable element also interposed between said passages, said pressure responsive element being adapted to be subjected to the pressure of the system with which said valve is used and to rupture when the pressure of the system exceeds a predetermined intensity to thereby connect said inlet and outlet passages independent of the operation of said valve head, and a thermally responsive element interposed between said passages and adapted to provide a connection between said passages when said thermally responsive element is subjected to a predetermined temperature.

2. A relief valve comprising a valve casing, a valve seat of disc-like annular form having a valve seating surface of materially less diameter than the supported zone of said valve seat, a supplemental valve head supporting element, and a pressure responsive valve head normally yieldingly held in valve closing engagement with said valve seat, said valve seat being adapted to release said valve head thereby permitting the valve head to move beyond its normal seating position into engagement with said supplemental valve head supporting element to permanently open said valve when said valve seat is subjected to predetermined excessive pressure conditions, the operation of said valve seat being independent of the temperature to which it is subjected.

3. A relief valve structure comprising a cast metal valve casing having an annular shoulder and a screw threaded portion adjoining the shoulder, an annular valve seat adapted to be removably received on said shoulder, a valve cage of cylindrical form having a wrench-engaging portion at one end and a screw threaded portion at the other end adapted to engage the correspondingly threaded portion of said casing to removably clamp said valve seat on said annular shoulder, a valve head, a valve cap solely carried by the casing, and valve gear disposed substantially within said valve cage and engaging said valve cap to exert yielding seating pressure on said valve head.

4. A relief valve structure comprising a cast metal valve casing having an annular shoulder and a screw threaded portion adjoining the shoulder formed therein, an annular valve seat adapted to be removably mounted on said shoulder, a valve cage of cylindrical form having a screw threaded portion adapted to engage the correspondingly threaded portion of said casing to removably clamp said valve seat on said annular shoulder, the end of said valve cage remote from said threaded portion being adapted to extend beyond the side walls of said casing for the convenient removal of said valve cage, a valve head, valve gear disposed partially within said valve cage and adapted to exert yielding seating pressure on said valve head, and a valve cap carried solely by the casing adapted to enclose said valve cage.

5. A relief valve structure comprising a cast metal valve casing having an annular shoulder and a screw threaded portion formed therein immediately adjoining said shoulder, an annular valve seat adapted to be removably mounted on said shoulder, a valve cage of cylindrical form having a screw threaded portion at one end thereof adapted to engage the correspondingly threaded portion of said casing to removably clamp said valve seat on said annular shoulder, a portion of said valve cage on the end thereof opposite the said threaded end extending beyond the side walls of said casing for the convenient removal of said valve cage, a valve head, valve gear disposed partially within said valve cage and adapted to exert yielding seating pressure on said valve head, and a valve cap adapted to enclose said valve cage, and constituting means for adjusting the yielding pressure exerted by said valve gear on said valve head.

6. In a relief valve, a valve seat made up of a plurality of interconnected annular rings, one of which is made of frangible material, said seat being adapted to rupture when subjected to pressures of predetermined magnitude within the range of operation of the remainder of the valve structure and of the device to be protected thereby, the rupturing of said valve seat being adapted to take place substantially independently of the temperature to which the seat is subjected, provided the temperature which the valve seat is subjected to does not exceed a predetermined maximum.

7. A relief valve comprising a valve casing provided with inlet and outlet passages, a rigidly and removably mounted pressure responsive valve seat adapted primarily to respond independently of the remainder of the valve structure to predetermined fluid pressures, means for normally rigidly and removably securing the valve seat in the casing, a valve head seated on said valve seat, a spring normally acting on the valve head to close the valve, and a valve cap forming an abutment for said spring.

8. A relief valve comprising a valve casing having a valve seat supporting shoulder formed therein, a frangible valve seat of annular form adapted to be carried from said shoulder and having an inner marginal edge portion extending inwardly well beyond the innermost supporting portion of said shoulder, and a valve head adapted to seat with valve closing pressure on said valve seat, the surface of engagement of the valve head being well within the supporting shoulder whereby compressive stresses in the body of the seat originating from the pressure of the valve head are avoided.

9. A relief valve comprising a valve casing having a valve seat supporting shoulder formed therein, a valve seat of disc form embodying fusible material, means engaging only the outer marginal portion of said seat adapted to secure it within the valve casing, a pressure controlled valve head having a smaller outer diameter than the diameter of the innermost supporting edge of said shoulder and being releasable from the engaged portion of the valve seat when subjected to predetermined temperatures, and a spring reacting on said valve casing and said valve head to maintain the valve in a normally closed position.

10. A relief valve comprising a valve casing having a valve seat supporting shoulder formed therein, a pressure controlled valve head, and a frangible and fusible valve seat of disc form supported on said shoulder solely adjacent its outer marginal edge portions, the inner marginal edge portions of said valve seat being unsupported in the direction of movement of the valve head and releasable from the outer portion of the valve seat when subjected to predetermined temperature or pressure conditions.

11. A valve element for use in a relief valve comprising integrally united fusible and independently frangible portions, a valve head, and resilient means to urge said valve head against said valve element, said element having an unsupported zone adapted to be subjected to variable fluid pressures, mechanical stresses and to temperature changes whereby said element is caused to rupture at predetermined abnormal temperatures and at predetermined abnormal pressures.

12. A relief valve comprising a valve casing, a pressure controlled valve head mounted in the casing, and a valve seat of annular form releasably supported within said casing solely adjacent its outer marginal edge portions, the inner marginal edge portions of said valve seat being unsupported in the direction of movement of the valve head, said unsupported portion of said valve seat being adapted to break away from said outer marginal edge portions of said valve seat and release said valve head when said valve seat is subjected to predetermined pressure conditions to permanently open said valve.

13. A relief valve comprising a valve casing provided with inlet and outlet passages, a rigidly and removably mounted temperature responsive valve seat adapted primarily to respond independently of the remainder of the valve structure to predetermined fluid temperatures, means for normally rigidly and removably securing the valve seat in the casing, a valve head seated on said valve seat, a spring normally acting on the valve head to close the valve, a valve cap forming an abutment for said spring, and means cooperating with said valve head to maintain the valve in a permanently open position when said valve seat has responded to predetermined fluid temperatures.

14. A relief valve comprising a valve casing provided with inlet and outlet passages, a rigidly and removably mounted pressure and temperature responsive valve seat adapted primarily to respond independently of the remainder of the valve structure to predetermined fluid pressures and temperatures, means for normally rigidly and removably securing the valve seat in the casing, a valve head seated on said valve seat, a spring normally acting on the valve head to close the valve, and a valve cap forming an abutment for said spring.

15. A relief valve comprising a valve casing, a valve seat of disc-like annular form having a valve seating surface of materially less diameter than the supported zone of said valve seat, a supplemental valve head supporting element, and a pressure responsive valve head normally yieldingly held in valve closing engagement with said valve seat, said valve seat being adapted to release said valve head thereby permitting the valve head to move beyond its normal seating position into engagement with said supplemental valve head supporting element to permanently open said valve when said valve seat is subjected to predetermined excessive temperature conditions.

16. A relief valve comprising a valve casing provided with inlet and outlet passages, a rigidly and removably mounted temperature responsive valve seat adapted primarily to respond independently of the remainder of the valve structure to predetermined temperatures, means for normally rigidly and removably securing the valve seat in the casing, a valve head seated on said valve seat, a spring normally acting on the valve head to close the valve, and a valve cap forming an abutment for said spring.

17. A relief valve structure comprising a cast metal valve casing having an annular shoulder and a screw threaded portion adjoining the shoulder, a valve cage of cylindrical form having a wrench-engaging portion at one end and a screw threaded portion at the other end adapted to engage the correspondingly threaded portion of said casing to removably clamp said valve seat on said annular shoulder, a valve head, a valve cap solely carried by the casing, valve gear disposed substantially within said valve cage and engaging said valve cap to exert yielding seating pressure on said valve head, and external manually operated means for lifting the valve head from the valve seat when the valve is assembled.

18. A relief valve comprising a valve casing provided with inlet and outlet passages, a rigidly and removably mounted pressure and temperature responsive valve seat adapted primarily to respond independently of the remainder of the valve structure to predetermined fluid pressures and temperatures, means for normally rigidly and removably securing the valve seat in the casing, a valve head seated on said valve seat, a spring normally acting on the valve head to close the valve, and a valve cap forming an abutment for said spring, and external manually operable means carried by said valve cap for lifting said valve head from said valve seat to open said valve.

19. A relief valve comprising a valve casing provided with inlet and outlet passages, a rigidly and removably mounted temperature responsive valve seat adapted primarily to respond independently of the remainder of the valve structure to predetermined fluid temperatures, means for normally rigidly and removably securing the valve seat in the casing, a valve head seated on said valve seat, a spring normally acting on the valve head to close the valve, a valve cap forming an abutment for said spring, means cooperating with said valve head to maintain the valve in a permanently open position when said valve seat has responded to predetermined fluid temperatures, and external manually operable means carried by said valve cap for lifting said valve head from said valve seat to open said valve.

In testimony whereof I have affixed my signature.

ARTHUR FRIEDMAN.